US012504678B2

(12) United States Patent
Hou et al.

(10) Patent No.: US 12,504,678 B2
(45) Date of Patent: Dec. 23, 2025

(54) PROJECTION DEVICE

(71) Applicant: Coretronic Corporation, Hsin-Chu (TW)

(72) Inventors: Kai-Lun Hou, Hsin-Chu (TW); Shi-Wen Lin, Hsin-Chu (TW); Wen-Jui Huang, Hsin-Chu (TW); Wen-Hao Chu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 322 days.

(21) Appl. No.: 18/475,251

(22) Filed: Sep. 27, 2023

(65) Prior Publication Data

US 2024/0111207 A1 Apr. 4, 2024

(30) Foreign Application Priority Data

Sep. 30, 2022 (CN) ........................ 202211207794.X

(51) Int. Cl.

*G03B 21/16* (2006.01)
*G03B 21/14* (2006.01)
*G03B 21/20* (2006.01)
*G03B 31/00* (2021.01)

(52) U.S. Cl.

CPC ........... *G03B 21/16* (2013.01); *G03B 21/145* (2013.01); *G03B 21/2013* (2013.01); *G03B 21/2033* (2013.01); *G03B 31/00* (2013.01)

(58) Field of Classification Search

CPC .. G03B 21/145; G03B 21/16; G03B 21/2026; G03B 21/2033; G02B 7/008; H04N 9/3144; G02F 1/133382; F25B 2321/021; F25B 2321/0212; F25B 2321/025

See application file for complete search history.

(56) References Cited

U.S. PATENT DOCUMENTS 5,676,442 A * 10/1997 Fujimori .............. H04N 9/3144 348/E9.027
5,951,136 A * 9/1999 Furuhata .............. H04N 9/3141 348/E5.143

(Continued)

FOREIGN PATENT DOCUMENTS

CN 105159018 12/2015
CN 207249336 4/2018

(Continued)

*Primary Examiner* — Pascal M Bui Pho
(74) *Attorney, Agent, or Firm* — JCIPRNET

(57) ABSTRACT

A projection device including a casing, a light source module, an optical engine module and a projection lens is provided. A front cover, a rear cover, a first side cover, a second side cover, an upper cover and a lower cover of the casing surround an accommodating space. The light source module includes a first and a second light sources, and a first and a second light source heat dissipation modules. The lower cover has a first, a second and a third air inlets. The first and the second side covers respectively have a first and a second air outlets. The first and the second light source heat dissipation modules are correspondingly disposed above the first air inlet and correspond to the first air outlet. The second and the third air inlets are respectively disposed below two sides of the projection lens and adjacent to the front cover.

16 Claims, 6 Drawing Sheets

(56) References Cited

U.S. PATENT DOCUMENTS

| | | | | | |
|---|---|---|---|---|---|
| 6,007,205 | A * | 12/1999 | Fujimori | G03B 21/16 | 353/57 |
| 6,111,630 | A * | 8/2000 | Watanuki | H04N 5/7441 | 349/161 |
| 6,428,170 | B1 * | 8/2002 | Haba | C09K 5/00 | 353/57 |
| 6,471,357 | B1 * | 10/2002 | Hara | H04N 9/3141 | 353/57 |
| 6,481,854 | B1 * | 11/2002 | Sugawara | G02F 1/133385 | 353/57 |
| 6,513,936 | B1 * | 2/2003 | Ishiwa | H04N 9/3141 | 348/E5.143 |
| 6,641,267 | B2 * | 11/2003 | Ohishi | G03B 21/18 | 353/58 |

FOREIGN PATENT DOCUMENTS

| | | |
|---|---|---|
| CN | 108427240 | 8/2018 |
| CN | 208752380 | 4/2019 |

* cited by examiner

PROJECTION DEVICE

CROSS-REFERENCE TO RELATED APPLICATION

This application claims the priority benefit of China application serial no. 202211207794.X filed on Sep. 30, 2022. The entirety of the above-mentioned patent application is hereby incorporated by reference herein and made a part of this specification.

BACKGROUND

Technical Field

The disclosure relates to an optical device, and particularly relates to a projection device.

Description of Related Art

In an existing projection TV (such as a laser TV), a design of an air inlet and an air outlet mostly adopts rear-in and left/right-out, or left-in and right-out. When adopting the design of rear-in and left/right-out, if there are multiple light sources, since not all of the light sources may be placed upstream, heat dissipation efficiency of the downstream light sources will be poor. When adopting the design of left-in and right-out, a lens will be heated by hot air, causing a temperature difference between two sides of a lens barrel, which causes a problem of thermal drift of image and affects imaging quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a projection device, which has better imaging quality.

Other objects and advantages of the disclosure may be further illustrated by the technical features broadly embodied and described as follows.

In order to achieve one or a portion of or all of the objects or other objects, an embodiment of the disclosure provides a projection device including a casing, a light source module, an optical engine module and a projection lens. The casing includes a front cover, a rear cover, a first side cover and a second side cover connecting the front cover and the rear cover, an upper cover and a lower cover. The front cover, the rear cover, the first side cover and the second side cover are located between the upper cover and the lower cover. The front cover, the rear cover, the first side cover, the second side cover, the upper cover and the lower cover surround an accommodating space. The light source module, the optical engine module and at least part of the projection lens are arranged in the accommodating space. The light source module includes a first light source and a second light source, a first light source heat dissipation module connected to the first light source, and a second light source heat dissipation module connected to the second light source. The optical engine module is connected to the projection lens and is located on a light transmission path of the first light source and the second light source. The lower cover has a first air inlet, a second air inlet and a third air inlet. The first side cover and the second side cover respectively have a first air outlet and a second air outlet. The first light source heat dissipation module and the second light source heat dissipation module are correspondingly disposed above the first air inlet and correspond to the first air outlet. The second air inlet and the third air inlet are respectively disposed below two sides of the projection lens and adjacent to the front cover.

Based on the above description, the embodiments of the disclosure have at least one of the following advantages or effects. In the design of the projection device of the disclosure, the lower cover has the first air inlet, the second air inlet and the third air inlet, and the first side cover and the second side cover respectively have the first air outlet and the second air outlet. The first light source heat dissipation module and the second light source heat dissipation module are correspondingly disposed above the first air inlet and correspond to the first air outlet, and the second air inlet and the third air inlet are respectively disposed below the two sides of the projection lens and adjacent to the front cover. In this way, in addition to placing all of the light source heat dissipation modules at the first air inlet for cooling to obtain better heat dissipation efficiency, the cold air may also be introduced into the projection device to increase a flow rate through the arrangement of the second air inlet and the third air inlet. Therefore, the projection device of the disclosure may have better imaging quality.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
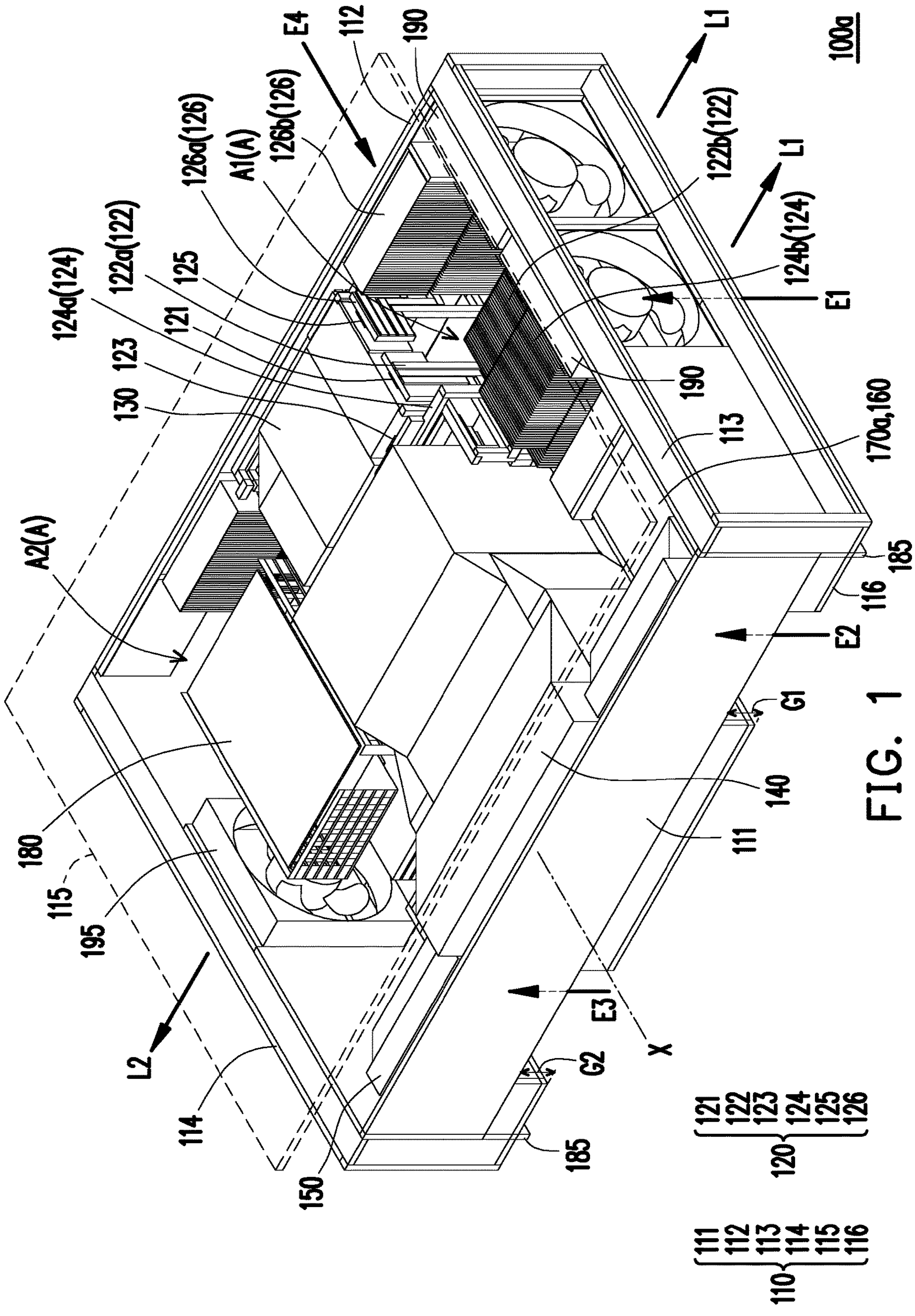
FIG. 1 is a schematic three-dimensional view of a projection device according to an embodiment of the disclosure.
Figure 2:
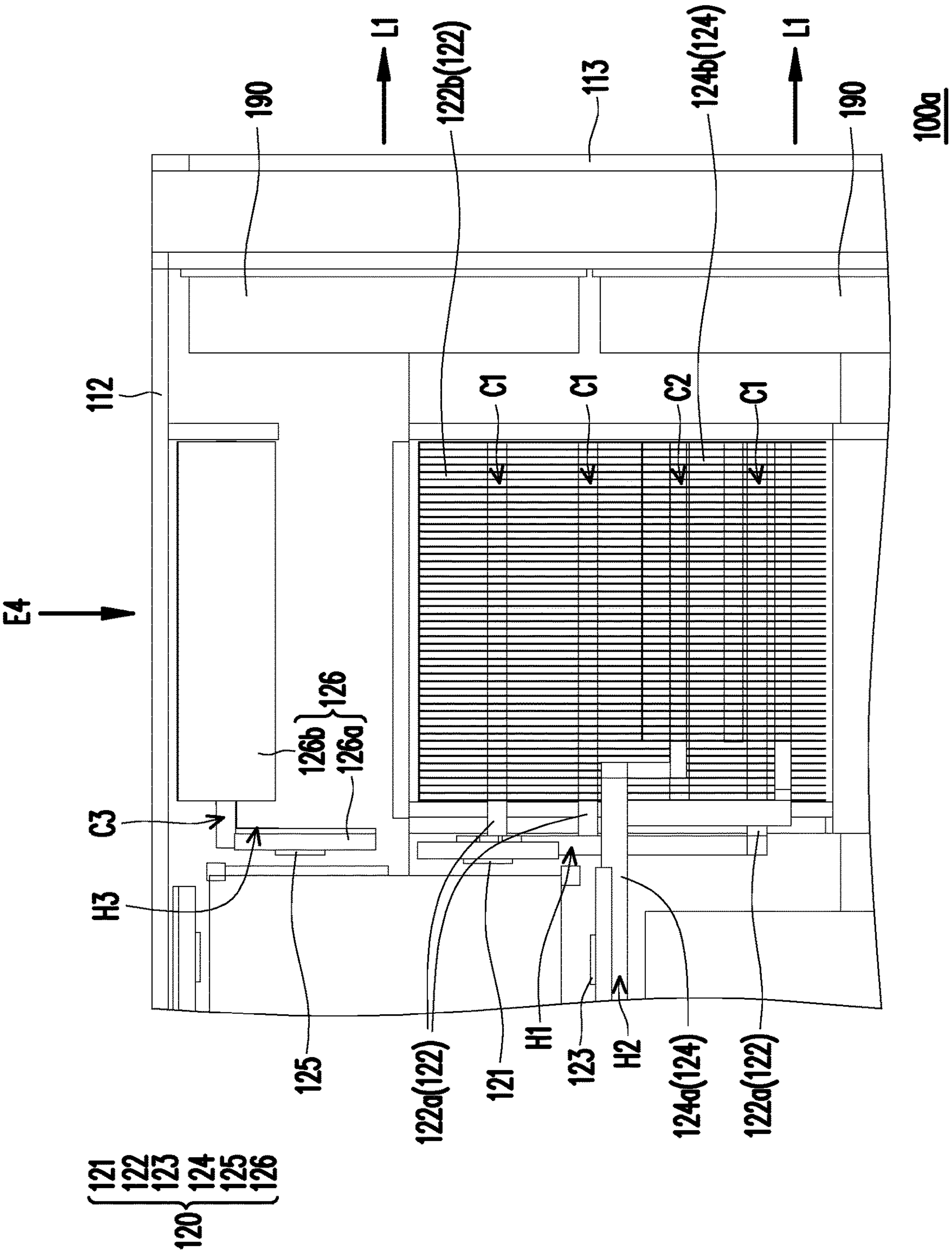
FIG. 2 is a partial schematic top view of the projection device of FIG. 1.
Figure 3:
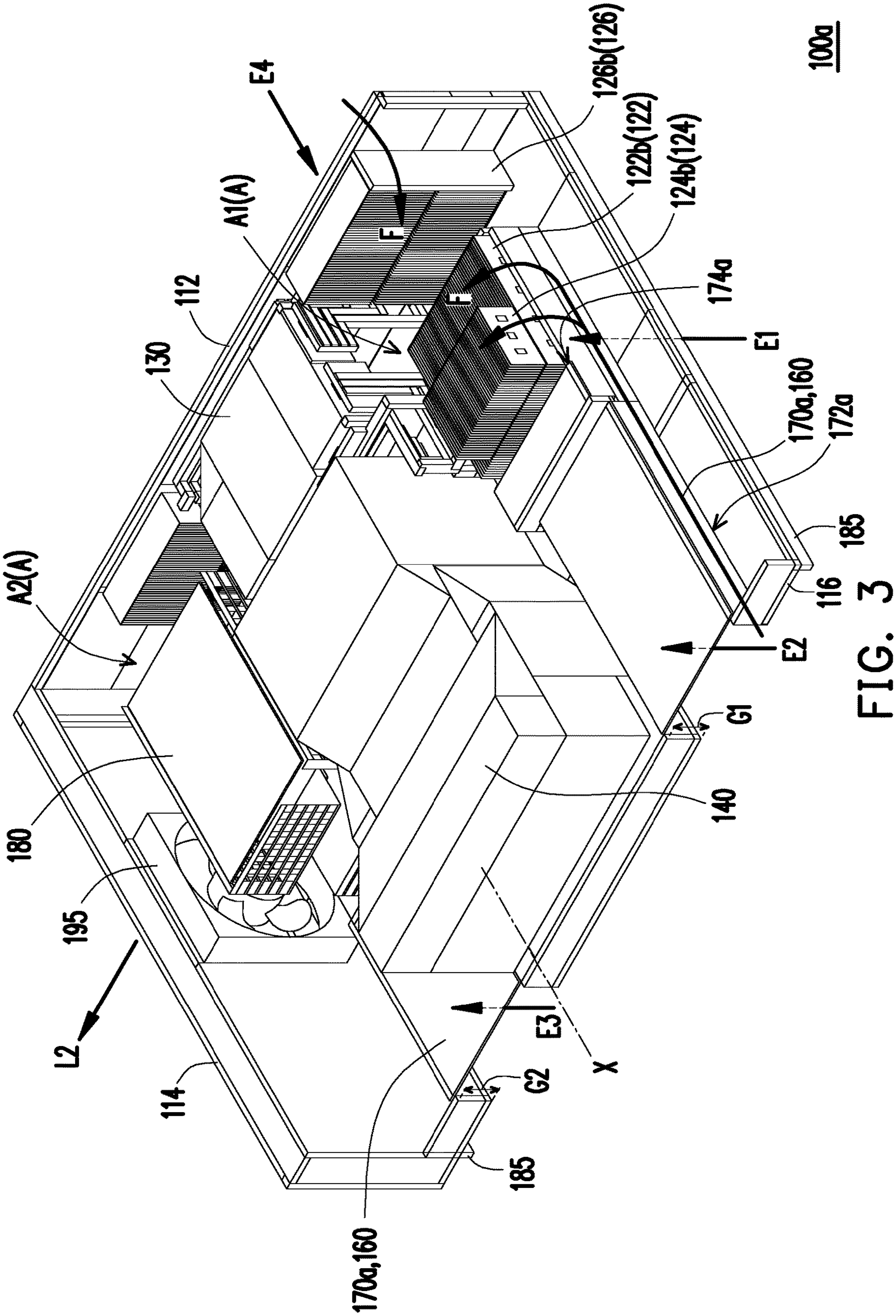
FIG. 3 is a schematic three-dimensional view of the projection device of FIG. 1 with some components removed.
Figure 4:
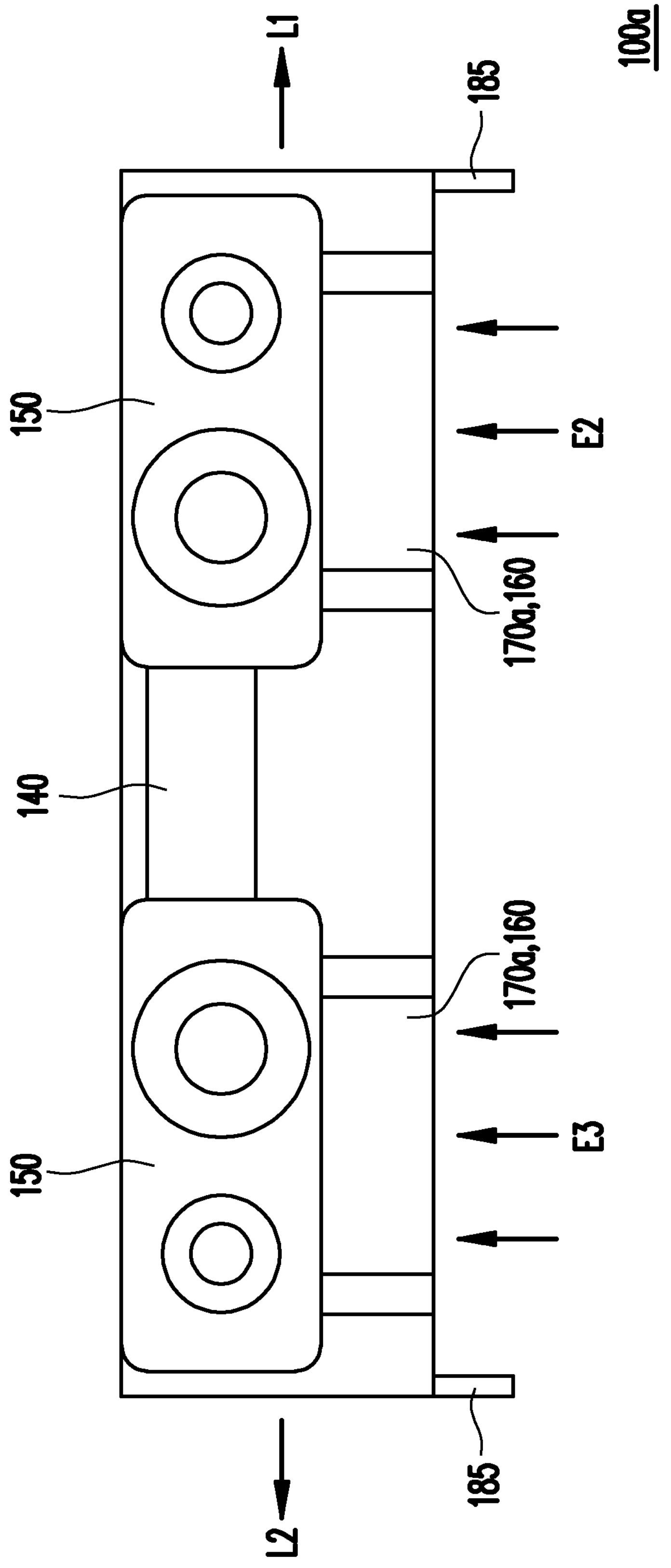
FIG. 4 is a schematic front view of the projection device of FIG. 1.

FIG. 1 is a schematic three-dimensional view of a projection device according to an embodiment of the disclosure. FIG. 2 is a partial schematic top view of the projection device of FIG. 1. FIG. 3 is a schematic three-dimensional view of the projection device of FIG. 1 with some components removed. FIG. 4 is a schematic front view of the projection device of FIG. 1. For the convenience of description, an upper cover of a casing in FIG. 1 is represented by a dotted line, and some components are omitted in FIG. 4.

In detail, referring to FIG. 1 first, in the embodiment, a projection device 100*a* includes a casing 110, a light source module 120, an optical engine module 130 and a projection lens 140. The casing 110 includes a front cover 111, a rear cover 112, a first side cover 113 and a second side cover 114 connecting the front cover 111 and the rear cover 112, an upper cover 115 and a lower cover 116. The front cover 111, the rear cover 112, the first side cover 113 and the second side cover 114 are located between the upper cover 115 and the lower cover 116. The front cover 111, the rear cover 112, the first side cover 113, the second side cover 114, the upper cover 115 and the lower cover 116 surround an accommodating space A. The light source module 120, the optical engine module 130 and at least a part of the projection lens 140 are disposed in the accommodating space A. In the embodiment, the projection lens 140 is disposed in the accommodating space A between the front cover 111 and the rear cover 112, and is disposed adjacent to the front cover 111 for projecting an image toward a projection screen. The projection lens 140 may be an ultra short throw (UST) lens, and projects an image toward the projection screen through a projection hole on the upper cover 115. In this case, the front cover 111 does not have a projection hole, but the disclosure is not limited thereto. In another embodiment, the front cover 111 may have a projection hole, and the projection lens 140 may project an image toward the projection screen through the projection hole on the front cover 111. In the case, the projection lens 140 may be an UST lens or a general projection lens, and the projection lens 140 may be disposed in the accommodating space A and located between the front cover 111 and the rear cover 112, or a part of the projection lens 140 is located in the projection hole of the front cover 111, and the other part may be located in the accommodating space A. The light source module 120 includes a first light source 121 and a second light source 123, a first light source heat dissipation module 122 connected to the first light source 121, and a second light source heat dissipation module 124 connected to the second light source 123. The optical engine module 130 is connected to the projection lens 140 and is located on a light transmission path of the first light source 121 and the second light source 123. The lower cover 116 has a first air inlet E1, a second air inlet E2 and a third air inlet E3. The first side cover 113 and the second side cover 114 respectively have a first air outlet L1 and a second air outlet L2. The first light source heat dissipation module 122 and the second light source heat dissipation module 124 are correspondingly disposed above the first air inlet E1 and correspond to the first air outlet L1. The second air inlet E2 and the third air inlet E3 are respectively disposed below two sides of the projection lens 140 and adjacent to the front cover 111.

In detail, in the embodiment, the rear cover 112 of the casing 110 has a fourth air inlet E4. The light source module 120 may further optionally include a third light source 125 and a third light source heat dissipation module 126 connected to the third light source 125. In other words, the third light source 125 and the third light source heat dissipation module 126 may be selectively configured according to an actual design requirement. In the embodiment, in order to clearly illustrate their corresponding positions in the projection device 100*a*, the third light source 125 and the third light source heat dissipation module 126 are shown in the corresponding drawings, but it is not intended to limit the embodiment to necessarily have the third light source 125 and the third light source heat dissipation module 126. In another embodiment, the third light source 125 and the third light source heat dissipation module 126 may not be provided. The third light source heat dissipation module 126 is disposed corresponding to the fourth air inlet E4, so that a cooling airflow F may enter the third light source heat dissipation module 126 from the fourth air inlet E4 to take away the heat of the third light source heat dissipation module 126, and is then expelled from the first air outlet L1 through a first fan 190. In other embodiments, the light source module 120 may further selectively include more light sources and more light source heat dissipation modules according to actual requirements, and the number thereof is not limited by the disclosure. An optical axis X of the projection lens 140 is located at a center point of the front cover 111 of the casing 110. A configuration position of the projection lens 140 divides the accommodating space A into a first region A1 on one side of the projection lens 140 and a second region A2 on the other side of the projection lens 140. The first air inlet E1, the second air inlet E2, the fourth air inlet E4 and the first air outlet L1 are located in the casing 110 corresponding to the first region A1. The third air inlet E3 and the second air outlet L2 are located in the casing 110 corresponding to the second region A2. Preferably, an orthogonal projection of the projection lens 140 on the lower cover 116 is not overlapped with the second air inlet E2 and the third air inlet E3 on the lower cover 116.

Referring to FIG. 2 and FIG. 3 at the same time, the first light source heat dissipation module 122 and the second light source heat dissipation module 124 of the embodiment are stacked in a direction from the lower cover 116 to the upper cover 115, but the embodiment is not limited thereto. In another embodiment, the first light source heat dissipation module 122 and the second light source heat dissipation module 124 may also be disposed separately instead of being stacked together. The first light source heat dissipation module 122 and the second light source heat dissipation module 124 are correspondingly disposed above the first air inlet E1, and the third light source heat dissipation module 126 is disposed corresponding to the fourth air inlet E4, which means that all of the light source heat dissipation modules are placed at the air inlets for cooling, so that the projection device 100*a* has a better heat dissipation effect.

Further, the first light source heat dissipation module 122 includes a plurality of first heat pipes 122*a* and a first heat dissipation fin set 122*b*. A plurality of condensation ends C1 of the plurality of first heat pipes 122*a* are connected to the first heat dissipation fin set 122*b*, and a plurality of evaporation ends H1 of the plurality of first heat pipes 122*a* are connected to the first light source 121. The second light source heat dissipation module 124 includes a plurality of second heat pipes 124*a* and a second heat dissipation fin set 124*b*. A plurality of condensation ends C2 of the plurality of second heat pipes 124*a* are connected to the second heat dissipation fin set 124*b*, and a plurality of evaporation ends H2 of the plurality of second heat pipes 122*a* are connected to the second light source 123. The third light source heat dissipation module 126 includes a plurality of third heat pipes 126*a* and a third heat dissipation fin set 126*b*. A plurality of condensation ends C3 of the plurality of third heat pipes 126*a* are connected to the third heat dissipation fin set 126*b*, and a plurality of evaporation ends H3 of the plurality of third heat pipes 126*a* are connected to the third light source 125. Herein, the first light source 121, the second light source 123 and the third light source 125 are red light-emitting diodes, blue light-emitting diodes and green light-emitting diodes, or the first light source 121, the second light source 123 and the third light source 125 are red laser diodes, blue laser diodes and green laser diodes.

Referring to FIG. 1 and FIG. 3 again, in order to achieve a better audio-visual experience, the projection device 100*a* of the embodiment may selectively include two speakers 150, which are disposed in the accommodating space A and adjacent to the front cover 111. In other words, the speakers 150 may be selectively configured according to actual design requirements. In the embodiment, in order to clearly illustrate a corresponding position in the projection device 100*a*, the speakers 150 are shown in the corresponding drawings, but it is not intended to limit the embodiment to necessarily have the speakers 150. In another embodiment, the speakers 150 may not be provided. The two speakers 150 are respectively located on the two sides of the projection lens 140, wherein the two speakers 150 are correspondingly disposed above the second air inlet E2 and the third air inlet E3.

Moreover, the projection device 100*a* of the embodiment may optionally include a bracket 160, which is disposed in the accommodating space A and located between the two speakers 150 and the lower cover 116 for supporting the speakers 150. Specifically, the speakers 150 may be selectively set according to actual design requirements.

The projection device 100*a* of the embodiment further includes at least one air duct (two air ducts 170*a* are schematically shown) disposed in the accommodating space A and located between the two speakers 150 and the lower cover 116, and two gaps G1 and G2 are respectively formed between the two speakers 150 and the lower cover 116. Herein, the second air inlet E2 and the third air inlet E3 respectively correspond to the two gaps G1 and G2, and may introduce cold air into the projection device 100*a* to increase a flow rate. One air duct 170*a* is disposed corresponding to the gap G1, and one end 172*a* of the air duct 170*a* is connected to the second air inlet E2, and the other end 174*a* of the air duct 170*a* is adjacent to the first light source heat dissipation module 122 and the second light source heat dissipation module 124. Here, a part of the air duct 170*a* is the bracket 160 of the two speakers 150, and the two speakers 150 are suspended and fixed through the bracket 160 to avoid resonance with the casing 110. Since a part of the air duct 170*a* is used as the bracket 160 is used, in the embodiment, configuration of the bracket 160 may be omitted. In another embodiment, the air duct 170*a* is not used as the bracket 160, and the air duct 170*a* and the bracket 160 may be two independent components. In the embodiment, the first light source heat dissipation module 122 is partially embedded in the air duct 170*a*, and the first light source heat dissipation module 122 and the second light source heat dissipation module 124 are stacked in the direction from the lower cover 116 to the upper cover 115.

In addition, the projection device 100*a* of the embodiment further includes a first fan 190, which is disposed in the accommodating space A and is adjacent to the first air outlet L1. The first fan 190 is located between the first air outlet L1 and the first light source heat dissipation module 122 and is located between the first air outlet L1 and the second light source heat dissipation module 124. Preferably, no component is disposed between the first fan 190 and the first air outlet L1. In the embodiment, the cooling airflow F enters the air duct 170*a* from the first air inlet E1 and the second air inlet E2 of the lower cover 116, and is guided to the first light source heat dissipation module 122 and the second light source heat dissipation module 124 by the air duct 170*a* to take away the heat of the first light source heat dissipation module 122 and the second light source heat dissipation module 124, and is then expelled from the first air outlet L1 by the first fan 190.

Moreover, referring to FIG. 1, the projection device 100*a* of the embodiment further includes a power module 180, which is disposed in the casing 110 and located in the second region A2. The power module 180 is located between the projection lens 140 and the second air outlet L2. Namely, the light source module 120 and the power module 180 of the embodiment are placed on two sides by taking the projection lens 140 as a center, i.e., the light source module 120 is placed on a left side of the lens module 140, and the power module 180 is placed on a right side of the lens module 140.

In addition, the projection device 100*a* of the embodiment further includes a second fan 195, which is disposed in the accommodating space A and is adjacent to the second air outlet L2. The second fan 195 is located between the second air outlet L2 and the power module 180. Preferably, no component is disposed between the second fan 195 and the second air outlet L2. In the embodiment, the cooling airflow (not shown) enters the casing 110 from the third air inlet E3 of the lower cover 116 to take away the heat of the power module 180, and is then expelled from the second air outlet L2 by the second fan 195.

In addition, referring to FIG. 1 and FIG. 4 at the same time, in the embodiment, the projection device 100*a* may selectively include a blocking structure 185 disposed below the first side cover 113 and the second side cover 114, and the blocking structure 185 extends downward along the first side cover 113 and the second side cover 114 to the outside of the casing 110 to prevent the airflow from the first air outlet L1 and the second air outlet L2 from flowing into the first air inlet E1, the second air inlet E2 and the third air inlet E3 of the lower cover 116. Preferably, a distance between a lower edge of the blocking structure 185 and a table top is, for example, less than 5 mm. In an embodiment, the blocking structure 185 may be a part of the casing 110 and extend downward toward the lower cover 116 from the first side cover 113 and the second side cover 114. It should be noted that, in order to allow enough air flowing into the lower cover 116 to dissipate heat from the light source heat dissipation modules, neither the front cover 111 nor the rear cover 112 of the casing 110 is provided with the blocking structure 185. It should be noted that the blocking structure 185 may be selectively set according to actual design requirements. In the embodiment, in order to clearly illustrate a corresponding position in the projection device 100*a*, the blocking structure 185 is shown in the corresponding drawings, but it is not intended to limit the embodiment to necessarily have the blocking structure 185. In another embodiment, the blocking structure 185 may not be provided.

In brief, in the design of the projection device 100*a* of the embodiment, the first light source heat dissipation module 122 and the second light source heat dissipation module 124 are correspondingly disposed above the first air inlet E1, and the third light source heat dissipation module 126 is disposed corresponding to the fourth air inlet E4, which means that the light source heat dissipation modules are all placed at the air inlets for cooling, so that the projection device 100*a* may have a better heat dissipation effect. In addition, the second air inlet E2 and the third air inlet E3 disposed below the two sides of the projection lens 140 and adjacent to the front cover 111 may introduce cool air into the projection device 100*a* to increase a flow rate. Therefore, the projection device 100*a* of the embodiment may have better imaging quality.

In addition, since the heat generated by the first light source heat dissipation module 122, the second light source heat dissipation module 124 and the third light source heat dissipation module 126 located in the first region A1 on side of the projection lens 140 and the optical engine module 130 in the embodiment is expelled by the cooling airflow F flowing in the first air inlet E1, the second air inlet E2, the fourth air inlet E4 and the first air outlet L1 in the first region A1, while the heat generated by the power module 180 located in the second region A2 on the other side of the projection lens 140 is expelled by the cooling airflow F flowing in the third air inlet E1 and the second air outlet L2 of the second region A2, an amount of heat generated by the light source heat dissipation modules and the power module 180 that flows through the projection lens 140 and the optical engine module 130 may be reduced, which mitigates a problem of thermal drift, etc., caused by heating of the projection lens 140.

Other embodiments are provided below for further description. It should be noticed that reference numbers of the components and a part of contents of the aforementioned embodiment are also used in the following embodiment, wherein the same reference numbers denote the same or like components, and descriptions of the same technical contents are omitted. The aforementioned embodiment may be referred for descriptions of the omitted parts, and detailed descriptions thereof are not repeated in the following embodiment.

Figure 5:
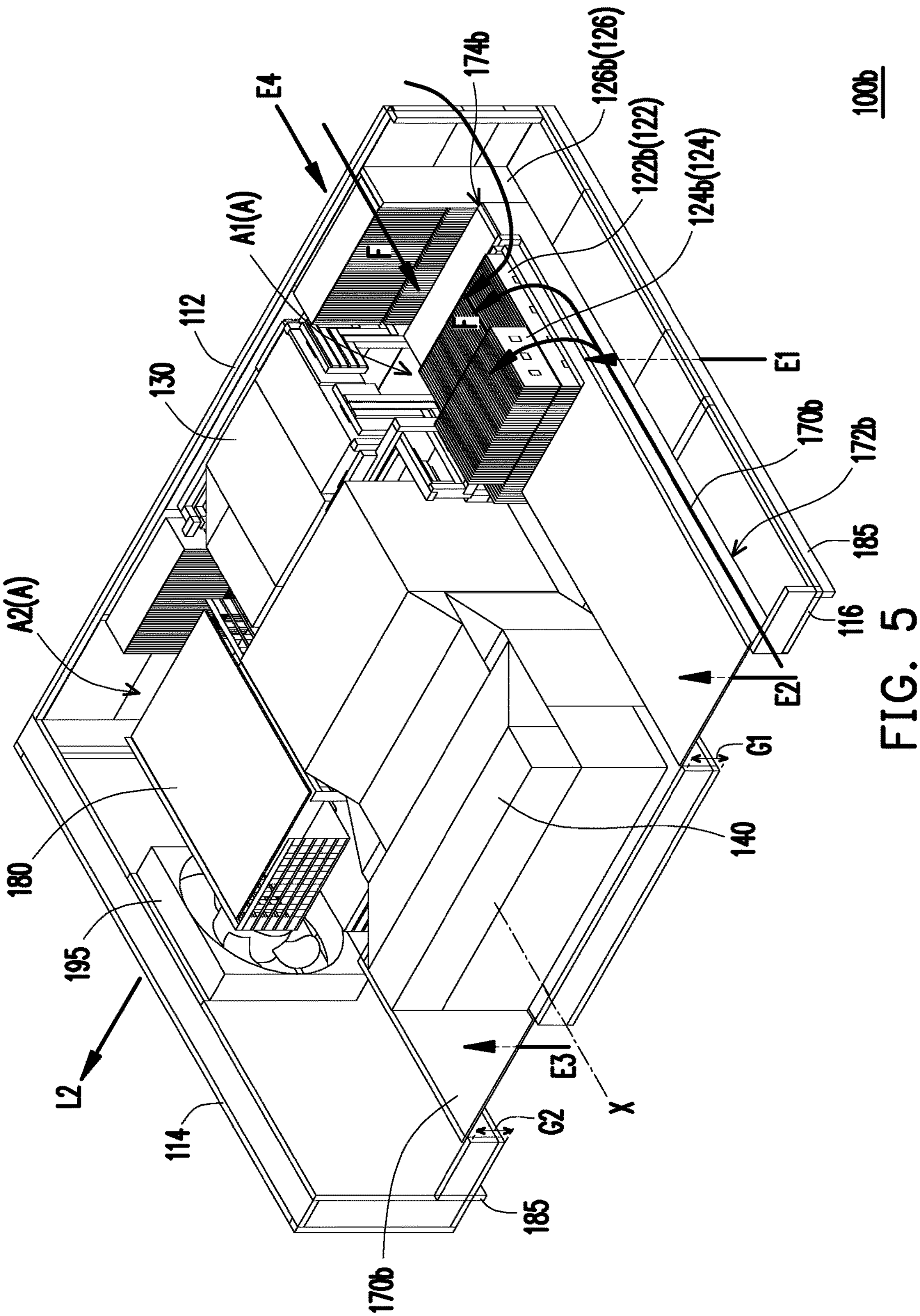
FIG. 5 is a schematic three-dimensional view of a projection device with some components removed according to another embodiment of the disclosure.

FIG. 5 is a schematic three-dimensional view of a projection device with some components removed according to another embodiment of the disclosure. Referring to FIG. 3 and FIG. 5 at the same time, a projection device 100*b* of the embodiment is similar to the projection device 100*a* of FIG. 3, and main differences there between are that in the embodiment, one end 172*b* of an air duct 170*b* is connected to the second air inlet E2, so that a part of the cooling airflow F entering from the fourth air inlet E4 may be guided to the first light source heat dissipation module 122 and the second light source heat dissipation module 124 to take away the heat of the first light source heat dissipation module 122 and the second light source heat dissipation module 124 after passing through the third light source heat dissipation module 126 and the air duct 170*a* in sequence, and then the cooling airflow F is expelled from the first air outlet L1 by the first fan 190. In the design of the embodiment, the cooling airflow F from the fourth air inlet E4 is used to take away the heat of the first light source heat dissipation module 122 and the second light source heat dissipation module 124, and then the first fan 190 is used to dissipate the heat through the first air outlet L1, which may effectively assist in heat dissipation.

Figure 6:
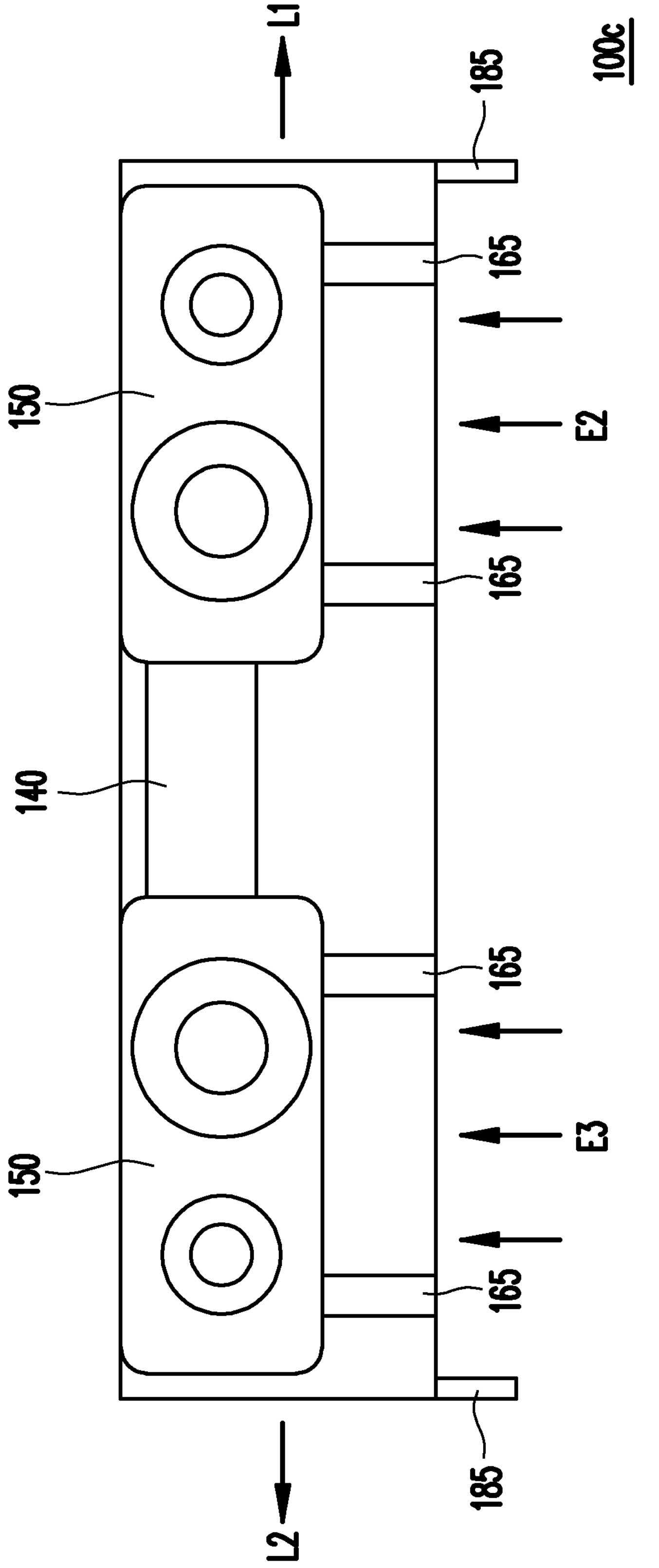
FIG. 6 is a schematic front view of a projection device according to another embodiment of the disclosure.

FIG. 6 is a schematic front view of a projection device according to another embodiment of the disclosure. Referring to FIG. 4 and FIG. 6 at the same time, a projection device 100*c* of the embodiment is similar to the projection device 100*a* of FIG. 4, and a main difference there between is that in the embodiment, the bracket 165 is embodied as a suspension design.

In summary, the embodiments of the disclosure have at least one of the following advantages or effects. In the design of the projection device of the disclosure, the lower cover has the first air inlet, the second air inlet and the third air inlet, and the first side cover and the second side cover respectively have the first air outlet and the second air outlet. The first light source heat dissipation module and the second light source heat dissipation module are correspondingly disposed above the first air inlet and correspond to the first air outlet, and the second air inlet and the third air inlet are respectively disposed below the two sides of the projection lens and adjacent to the front cover. In this way, in addition to placing all of the light source heat dissipation modules at the first air inlet for cooling to obtain better heat dissipation efficiency, the cold air may also be introduced into the projection device to increase a flow rate through the arrangement of the second air inlet and the third air inlet. Therefore, the projection device of the disclosure may have better imaging quality.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term “the disclosure” does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A projection device comprising:
a casing;
a light source module;
an optical engine module; and
a projection lens,
wherein:
the casing comprises a front cover, a rear cover, a first side cover and a second side cover connecting the front cover and the rear cover, an upper cover and a lower cover, wherein the front cover, the rear cover, the first side cover and the second side cover are located between the upper cover and the lower cover, and the front cover, the rear cover, the first side cover, the second side cover, the upper cover and the lower cover surround an accommodating space;
the light source module, the optical engine module and at least part of the projection lens are arranged in the accommodating space, the light source module comprises a first light source and a second light source, a first light source heat dissipation module connected to the first light source, and a second light source heat dissipation module connected to the second light source, the optical engine module is connected to the projection lens and is located on a light transmission path of the first light source and the second light source; and the lower cover has a first air inlet, a second air inlet and a third air inlet, the first side cover and the second side cover respectively have a first air outlet and a second air outlet, wherein the first light source heat dissipation module and the second light source heat dissipation module are correspondingly disposed above the first air inlet and correspond to the first air outlet, and the second air inlet and the third air inlet are respectively disposed below two sides of the projection lens and adjacent to the front cover.

2. The projection device as claimed in claim 1, wherein an orthogonal projection of the projection lens on the lower cover is not overlapped with the second air inlet and the third air inlet on the lower cover.

3. The projection device as claimed in claim 1, further comprising:
two speakers, disposed in the accommodating space and adjacent to the front cover, the two speakers being respectively located on the two sides of the projection lens, wherein the two speakers are correspondingly disposed above the second air inlet and the third air inlet.

4. The projection device as claimed in claim 3, further comprising:
a bracket, disposed in the accommodating space and located between the two speakers and the lower cover, and two gaps being respectively formed between the two speakers and the lower cover, wherein the second air inlet and the third air inlet respectively correspond to the two gaps.

5. The projection device as claimed in claim 4, further comprising:
at least one air duct, disposed corresponding to one of the two gaps, wherein one end of the at least one air duct is connected to the second air inlet, and the other end of the at least one air duct is adjacent to the first light source heat dissipation module and the second light source heat dissipation module.

6. The projection device as claimed in claim 4, wherein the light source module comprises a third light source and a third light source heat dissipation module connected to the third light source, the rear cover has a fourth air inlet, and the third light source heat dissipation module is disposed corresponding to the fourth air inlet.

7. The projection device as claimed in claim 6, further comprising:
at least one air duct, disposed corresponding to one of the two gaps, wherein one end of the at least one air duct is connected to the second air inlet, so that a part of a cooling airflow entering from the fourth air inlet is guided to the first light source heat dissipation module and the second light source heat dissipation module after passing through the third light source heat dissipation module and the at least one air duct in sequence.

8. The projection device as claimed in claim 6, wherein
the first light source heat dissipation module comprises a plurality of first heat pipes and a first heat dissipation fin set, a plurality of condensation ends of the plurality of first heat pipes are connected to the first heat dissipation fin set, and a plurality of evaporation ends of the plurality of first heat pipes are connected to the first light source;
the second light source heat dissipation module comprises a plurality of second heat pipes and a second heat dissipation fin set, a plurality of condensation ends of the plurality of second heat pipes are connected to the second heat dissipation fin set, and a plurality of evaporation ends of the plurality of second heat pipes are connected to the second light source; and
the third light source heat dissipation module comprises a plurality of third heat pipes and a third heat dissipation fin set, a plurality of condensation ends of the plurality of third heat pipes are connected to the third heat dissipation fin set, and a plurality of evaporation ends of the plurality of third heat pipes are connected to the third light source.

9. The projection device as claimed in claim 4, wherein the first light source, the second light source and the third light source are red light-emitting diodes, blue light-emitting diodes and green light-emitting diodes, or the first light source, the second light source and the third light source are red laser diodes, blue laser diodes and green laser diodes.

10. The projection device as claimed in claim 1, wherein a configuration position of the projection lens divides the accommodating space into a first region and a second region, the first air inlet, the second air inlet, the fourth air inlet and the first air outlet are located in the casing corresponding to the first region, and the third air inlet and the second air outlet are located in the casing corresponding to the second region.

11. The projection device as claimed in claim 10, further comprising:

a power module, disposed in the casing and located in the second region, wherein the power module is located between the projection lens and the second air outlet.

12. The projection device as claimed in claim 10, further comprising:

a first fan, disposed in the accommodating space and adjacent to the first air outlet, wherein the first fan is located between the first air outlet and the first light source heat dissipation module and is located between the first air outlet the second light source heat dissipation module.

13. The projection device as claimed in claim 12, further comprising:

a second fan, disposed in the accommodating space, and adjacent to the second air outlet, wherein the second fan is located between the second air outlet and the power module.

14. The projection device as claimed in claim 1, wherein an optical axis of the projection lens is located at a center point of the front cover of the casing.

15. The projection device as claimed in claim 1, further comprising:

a blocking structure disposed below the first side cover and the second side cover and extends downward along the first side cover and the second side cover to the outside of the casing to prevent an airflow flowing out of the first air inlet and the second air inlet from flowing into the first air inlet, the second air inlet and the third air inlet of the lower cover.

16. The projection device as claimed in claim 1, wherein the first light source heat dissipation module and the second light source heat dissipation module are stacked in a direction from the lower cover to the upper cover.

* * * * *